United States Patent
Wieczorek, Jr. et al.

(10) Patent No.: US 6,568,399 B1
(45) Date of Patent: May 27, 2003

(54) LOW APPLICATION TEMPERATURE HOT MELT ADHESIVE FOR CIGARETTE PREPARATION

(75) Inventors: Joseph Wieczorek, Jr., Flemington, NJ (US); Brian D. Morrison, Lebanon, NJ (US); Ingrid Cole, Somerville, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/299,516

(22) Filed: Apr. 26, 1999

(51) Int. Cl.[7] ................................................. A24D 3/02
(52) U.S. Cl. ..................... 131/90; 131/94; 131/365; 131/366; 156/327; 428/36.9; 428/522
(58) Field of Search ........................... 131/90, 94, 365, 131/366; 156/327; 428/36.9, 522

(56) References Cited

U.S. PATENT DOCUMENTS

| | | | |
|---|---|---|---|
| 3,419,641 A | 12/1968 | Peterkin et al. ............. 260/897 |
| 3,652,474 A | 3/1972 | Berry et al. ............. 260/27 EV |
| 3,723,371 A | 3/1973 | Campbell et al. .... 260/28.5 AN |
| 3,907,025 A | 9/1975 | Malcosky et al. ............. 165/63 |
| 4,221,226 A | 9/1980 | Kiefer et al. ................. 131/267 |
| 4,497,936 A | 2/1985 | Tancrede et al. ............. 525/222 |
| 4,497,941 A | 2/1985 | Aliani et al. ................. 526/331 |
| 4,613,632 A | 9/1986 | Aliani et al. ................. 523/172 |
| 4,752,634 A | 6/1988 | Goss ......................... 524/271 |
| 4,816,306 A | 3/1989 | Brady et al. ............. 428/36.92 |
| 4,874,804 A | 10/1989 | Brady et al. ................. 524/100 |
| 5,041,482 A | 8/1991 | Ornsteen et al. ............. 524/272 |
| 5,058,607 A | 10/1991 | Carter et al. .................. 131/58 |
| 5,107,866 A * | 4/1992 | Arnoff et al. ................ 131/365 |
| 5,310,803 A | 5/1994 | Hansen ........................ 525/228 |
| 5,331,033 A | 7/1994 | Stauffer et al. .............. 524/275 |
| 5,373,049 A | 12/1994 | Ornstern et al. ............. 524/487 |
| 5,498,224 A | 3/1996 | Kauffman et al. ............. 493/39 |
| 5,500,472 A | 3/1996 | Liedermooy et al. ........ 524/272 |
| 5,574,084 A | 11/1996 | Peacock ...................... 524/270 |
| 5,670,566 A | 9/1997 | Liedermooy et al. ........ 524/271 |
| 5,947,127 A | 9/1999 | Tsugaya et al. .............. 131/332 |
| 6,107,430 A * | 8/2000 | Dubois et al. ............ 525/348.5 |
| 6,117,945 A * | 9/2000 | Mehaffy et al. .............. 525/159 |

FOREIGN PATENT DOCUMENTS

| | | |
|---|---|---|
| EP | 0 547 797 A1 | 6/1993 |
| EP | 0 776 955 A1 | 6/1997 |
| GB | 2 172 893 A | 10/1986 |
| JP | KR 9303351 B | 4/1993 |
| JP | KR 9306085 B | 7/1993 |
| WO | WO 91/14750 | 10/1991 |
| WO | WO 97/33921 | 9/1997 |
| WO | WO 98/02498 | 1/1998 |
| WO | WO 98/21286 | 5/1998 |

OTHER PUBLICATIONS

Tabexpo98, Oct. 19–22, 1998, Stand 4230.

* cited by examiner

*Primary Examiner*—D. Lawrence Tarazano
(74) *Attorney, Agent, or Firm*—Cynthia L. Foulke

(57) ABSTRACT

A cigarette filter, process to manufacture, wherein a low application temperature ethylene copolymer based hot melt adhesive is applied to porous and/or nonporous plugwrap paper. As used herein, low application temperatures are temperature between 200° F. and 300° F. (93° C. and 149° C.), preferably, 240° F. to 275° F. (115° C. to 135° C.).

33 Claims, No Drawings

LOW APPLICATION TEMPERATURE HOT MELT ADHESIVE FOR CIGARETTE PREPARATION

BACKGROUND OF THE INVENTION

The present invention is directed to the use of low application temperature hot melt adhesive for cigarette filters. Specifically, the hot melt adhesives of the present invention are used to bond filter wrap seam and to anchor the filter element in place on the rod.

A standard filter tipped cigarette is produced by three different operations: (1) filter or plug manufacture, (2) rod manufacture, and (3) tipping.

The cigarette rod consists of a stream of tobacco wrapped in a paper tube, the paper tube being glued along one longitudinal edge or surface with a suitable adhesive. This operation takes place at speeds varying from 2,000 to 16,000 cigarettes per minute. The weight of the cigarette rod, diameter, and length are all closely monitored for both cost control and tax purposes.

The filter making operation is similar in many respects to the rod manufacture, but the materials and manufacturing equipment used are different. Tobacco smoke filters are most commonly manufactured from a crimped textile tow of cellulose acetate fibers. The tow is then warmed and rolled to produce a material about 9" wide, and containing an even distribution of fibers. The tow is "bloomed" in a known manner to separate the fibers, and a high boiling point solvent, commonly called a "plasticizer", i.e., triacetin, is applied by spraying, wicking, or other suitable means. The treated tow is then pulled into a cylindrical form and wrapped with paper. During an interval of time, which can be accelerated by heating, the plasticizer first partially dissolves the surface of the fibers causing them to become sticky and to bond together at points of contact with each other. The plasticizer then migrates into the fiber leaving the surface dry, but the fibers still remain bonded.

The bloomed tow is then formed into a tube, and wrapped in paper or plugwrap, the paper being glued along one longitudinal edge. Before the paper meets the tow material, adhesive is applied to the center and the edge forming the anchor and the seam. During this process, heater bars are used to extend the open time of the adhesive as it meets the tow. The formed filter rod is then passed under chiller plates to set the adhesive. This is necessary as the filter is immediately cut into smaller pieces.

In some applications, such as multi-component or charcoal type filters, a hot melt adhesive is pre-applied onto filter paper and then heat sealed by the filter making machine.

In conventional cigarette filter manufacture, a hot melt adhesive, applied at 350° F. (177° C.), is used for the seam and a second, aqueous adhesive, is used for the anchor. An aqueous adhesive is chosen with triacetin resistance. Because of the nature of the tow, there is a high degree of radial stress upon the glued bond, so any adhesive used must be able to stick almost instantly and hold during storage and use. This has led to the use of hot melt type adhesives, which by formulation are fast setting, and allow very high machine speeds to be used.

Currently polyethylene and ethylene vinyl acetate based hot melt adhesives are used for this filter or plugwrap application. These are preferred since they are relatively non-polar and resist the deteriorative effects of triacetin, the most commonly used plasticizer, which often migrates acting as a solvent for the adhesive causing bond deterioration.

Most commercially available adhesives used in cigarette manufacture are either hot melts which require temperatures of 350° F. (177° C.) or are aqueous to provide triacetin resistance.

However there are problems associated with use of conventional hot melt adhesives, which are applied at elevated temperatures, usually 350° F. These high temperatures increase the operator's risks with respect both to burns and to inhalation of residual volatiles. In addition, the high temperatures require more energy, placing greater demands on the manufacturing facility. The higher temperatures can also cause premature wear and tear on the application equipment i.e., nozzles, hoses and reservoir tanks.

The present invention uses low application temperature hot melt adhesives, which can be applied at temperatures in the range 200 to 300° F. (93° C. to 149° C.). The advantages of using such lower temperatures include reduced number of heater elements required in the adhesive reservoir, reduced volatile emissions, and reduced risk of injury and reduced wear and tear on the application equipment. The use of low temperature hot melt adhesives may also eliminate the need for use of both an aqueous and hot melt adhesive, since some of the hot melt adhesives of the present invention exhibit excellent triacetin resistance. Further, the lower temperatures reduce temperatures in the reactivation section of the machinery and eliminate the need for cooling plates. In addition, the hot melt adhesives of the present invention have a fast set speed, low bleed through, improved cuttability and are comparable or better than 350° F. hot melt adhesives in terms of triacetin resistance.

SUMMARY OF THE INVENTION

It has been found in accordance with the present invention, that low application temperature ethylene copolymer based hot melt adhesives provide unexpected advantages in cigarette filter manufacture.

DESCRIPTION OF THE INVENTION

The present invention is directed to the use of hot melt adhesive compositions, which can be applied at temperatures between 200 to 300° F. (93° C. to 149° C.), in the manufacture of cigarette filters. In particular, the present invention is directed to a process of making cigarette filters, and to cigarette filters, wherein a low application temperature ethylene copolymer based hot melt adhesive is applied to at least one longitudinal edge or surface of porous and/or non-porous plug wrap paper. The adhesives of the present invention are also applicable to multi-component filters or other filters which are prepared by preapplying the hot melt to filter paper, then heating the coated paper on the filter making machine. As used herein, low application temperatures are temperature between 200° F. and 300° F. (93° C. and 149° C.), preferably, 240° F. to 275° F. (115° C. to 135° C.).

The present invention is directed to the process, and to cigarette filters, which comprise any hot melt adhesive which can be applied at temperatures between 200 and 300° F. (93° C. and 149° C.). Adhesives suitable for use herein include the hot melt adhesives prepared from ethylene, ethylene n-butyl acrylate copolymers, ethylene/a-olefin copolymers, and ethylene vinyl acetate copolymers.

I. Ethylene n-butyl acrylate based hot melt adhesives.

The ethylene n-butyl acrylate copolymers (EnBA) useful herein are those containing at least about 10 to 40 weight percent n-butyl acrylate and having a melt index of at least about 40 dg/min, preferably at least about 400 dg/min. The preferred copolymers are available from Exxon under the designation XW 23-AH and comprise approximately 33 to 37 weight percent n-butyl acrylate by weight and have a melt index of about 400 dg/min. The amount of the copolymer present in the adhesive varies from about 5 to 45 weight percent by weight, preferably about 10 to 40 weight percent by weight.

Mixtures of EnBA copolymers may also be used as long as the resultant mixture falls within the described ranges of percent n-butyl acrylate by weight, and melt index. It is therefore possible to mix two ethylene n-butyl acrylate copolymers having different melt indices and different percentages of n-butyl acrylate. In a preferred embodiment, the EnBA copolymers described above may be used alone or as a blend with an EnBA copolymer having a melt index of 40 dg/min.

In addition to the components described above, the adhesive compositions of the present invention may optionally comprise a second EnBA copolymer, specifically one containing about 30 to 35, preferably 33 weight percent by weight of n-butyl acrylate and having a melt index of about 6 to 40 dg/min. The preferred copolymers are available from Elf Autochem under the designation LOTRYL 35BA40 and contain approximately 35 weight percent n-butyl acrylate by weight and have a melt index of about 40 dg/min. The amount of this copolymer present in the adhesive varies from about 1 to 25 weight percent by weight, preferably 5 to 20% by weight.

The present invention also contemplates the addition to the adhesive of a polymeric additive selected from the group consisting of ethylene methyl acrylate polymers containing 10 to 28 weight percent by weight methyl acrylate, ethylene acrylic acid copolymers having an acid number of 25 to 150, methyl (meth)acrylate copolymers, polyethylene, polypropylene, poly(butene-1-co-ethylene) polymers and low molecular weight and/or low melt index ethylene n-butyl acrylate copolymers. When such additive is present, it is present in amounts up to about 15 weight percent by weight of composition.

Tackifying resins useful in the EnBA adhesives of the invention include the aliphatic, aromatic or mixed aliphatic-aromatic hydrocarbon resins, and hydrogenated derivatives thereof, and terpenes and terpene derivatives having a Ring and Ball softening point of between about 70° C. and about 150° C. One skilled in the art would recognize that these tackifying resins are available with differing levels of hydrogenation.

Also included are the thermoplastic hydrocarbon resin having a Ring and Ball softening point below 130° C., preferably below 120° C. Representative resins include those derived from styrene, alpha-methylstyrene, and/or vinyltoluene, and polymers, copolymers and terpolymers of styrene, alpha-methylstyrene and/or vinyltoluene. Preferred is KRYSTALEX® 3085, a low molecular weight thermoplastic hydrocarbon polymer derived largely from alpha-methylstyrene which has a Ring and Ball softening point of 85° C. and is available from Hercules Inc.

The thermoplastic hydrocarbon resins are present in the adhesive compositions of the present invention in an amount of 10 to 60 weight percent by weight of the composition, preferably 20 to 40 weight percent.

The adhesive of the present invention may comprise one or more tackifying resins. For example, an adhesive may comprise -methyl styrene, or -methyl styrene and vinyl toluene.

Other useful tackifying resins include those sold under the tradenames EASTOAC from Eastman Chemical Company, which are partially hydrogenated cycloaliphatic petroleum hydrocarbon resin, ESCOREZ available from Exxon Chemical Company, which is also a partially hydrogenated cycloaliphatic petroleum hydrocarbon resin, WINGTACK which is an aliphatic, aromatic petroleum hydrocarbon resin available from Goodyear Chemicals, HERCOLITE which is a partially hydrogenated cycloaliphatic petroleum hydrocarbon resin available from Hercules, ZONATAC which is a styrenated terpene hydrocarbon resin, made from d-limonene and available from Arizona Chemical.

Waxes may be usefully employed in the adhesive compositions of the present invention. Waxes are commonly used to modify the viscosity and reduce tack at concentrations up to 60% by weight, preferably less than about 45% by weight. Waxes useful in the adhesives of the present invention include paraffin waxes, microcrystalline waxes, Fischer-Tropsch, polyethylene and by-products of polyethylene wherein $M_w$ is less than 3000. More preferably, the concentration of wax is less than 35% by weight for high melt point waxes.

Paraffin waxes suitable for use in the present invention include those having melting points in the range of about 130 to 200° F. (54° C. to 193° C.), such as, for example, PACEMAKER from Citgo, and R-2540 from Moore and Munger; and low melting point synthetic microcrystalline or Fischer-Tropsch waxes having a melting point of less than about 180° C. The most preferred wax is paraffin wax with a melting point of 150° C.

The adhesives of the invention preferably also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl 2,4,6-tris (3,5-di-tert-butyl-4-hydroxybenzyl) benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ehtyl 3,5-di-tert-butyl-4-hydroxy-benzoate; and sorbitol hexa[3-(3,5-di-tert-butyl-4-hydroxyphenyl)-propionate].

Commercially available. antioxidants include the hindered phenols known as IRGANOX, and available from Ciba-Geigy.

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight percent, preferably 0.25 to 1.0%. Other additives such as plasticizers, pigments, dyestuffs conventionally added to hot melt adhesives for various end uses contemplated as well as small amounts of additional tackifiers and/or waxes such as paraffin wax may also be incorporated in minor amounts, i.e., up to about 10% by weight, into the formulations of the present invention.

The adhesive compositions are prepared by blending the components in the melt at a temperature of about 121° C. until a homogeneous blend is obtained, approximately two hours. Various methods of blending are known to the art and any method that produces a homogeneous blend is satisfactory.

The resulting adhesives are characterized by viscosity less than about 4000 cps at 135° C. They may be applied at temperatures of 121° C. to 135° C. to provide superior adhesive bonds even when exposed to wide variety of temperature conditions. The adhesives possess excellent heat stability as characterized by the 260 hour 121° C. thermal stability test, with no signs of char, skinning or gel formation.

A preferred formulation for a hot melt adhesive prepared from EnBA copolymers is one comprising 15 to 45%, preferably 15 to 25%, ethylene n-butyl acrylate copolymers having a melt index of at least 200 dg/min, preferably at least about 300, 25 to 55%, preferably 30 to 40%, a-methyl styrene tackifying resins and 15 to 40%, preferably 25 to 35% of a low melting point paraffin wax which can be applied at temperatures of 225 to 275° F. (107° C. to 135° C.). Another preferred formulation will comprise 20% of an EnBA copolymer with a melt index of 300 dg/min and 10% of an EnBA copolymer with a melt index of 40 dg/min.

II. Ethylene α-olefin based hot melt adhesives

Another embodiment of the present invention is directed to hot melt adhesives prepared from:
 a) 20 to 40 parts ethylene/alpha olefin polymer;
 b) 20 to 40 parts tackifier; and
 c) 10 to 40 parts wax.

Ethylene/alpha olefin polymers useful herein are those having a composition distribution breath index greater than 50%, and Mw/Mn less than 6. In another embodiment the ethylene/alpha olefin polymers will have a melt index of 40 to 1000 dg/min, a melt point of 71 to 90° C., a density of 0.850 to 0.92, a composition distribution breath index greater than 50%, and Mw/Mn less than 6. Preferably, the ethylene/alpha olefin polymers will have a melt index of 50 to 500 dg/min and a density of 0.885 to 0.90. The ethylene/alpha olefin polymers may be copolymers of ethylene and any alpha olefin, for example butene.

As used herein, composition distribution index, or short chain branching distribution index, refers to the weight percent of polymer molecules having a comonomer content within 50% of the median total comonomer content.

Tackifiers useful in the present invention include aliphatic or cycloaliphatic hydrocarbons, aromatic hydrocarbons, aromatically modified aliphatic or cycloaliphatic hydrocarbons and mixtures thereof. EASTOTAC H100, a hydrogenated cyclopentadiene-based tackifier with a softening point of 100° C. is the most preferred tackifier.

Other tackifiers useful herein include polyterpenes, aromatic modified terpene, and combinations thereof. Also included are the hydrogenated derivatives of modified terpene resins. An example of a commercially available styreneated polyterpene is ZONATAC 105L which has a Ring and Ball softening point of about 105° C. and is available from Arizona Chemical Company.

The preferred tackifiers of the present invention are those having a softening point of 90 to 150° C. The present invention contemplates that the adhesive composition of the present invention comprise one or more of the above adhesive promoting tackifying resins.

Waxes suitable for use in the present invention include the low melting point synthetic paraffin waxes or polyethylene type waxes characterized by a melting point of about 130 to 200° F. (54° C. to 93° C.). The most preferred wax is PACEMAKER from Citgo.

The adhesives of the present invention may also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the deprotonated hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; sorbitol hexa[3-(3,5-di-tert-butyl-4-hydroxyphenyl)-propionate] and 2,6-ditertbutyl 4-methylphenol ("BHT"). An example of a commercially available antioxidant is IRGANOX 1010, a hindered phenol, available from Ciba Geigy.

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

The present invention also contemplates the addition to the adhesive of a polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene, poly(butene-1-co-ethylene) polymers, ethylene n-butyl acrylate copolymers and ethylene vinyl acetate copolymers. When such additive is present, it is present in amounts up to about 15 weight percent by weight of composition.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil, amide waxes and vinyl acetate modified synthetic waxes may also be incorporated in minor amounts, i.e., up to about 10 weight percent by weight, into the formulations of the present invention.

A preferred embodiment of the present invention is directed to a hot melt adhesive composition comprising:
 a) 0.5% IRGANOX 1010;
 b) 30% of an ethylene/-olefin copolymer having a composition distribution breath index greater than 50%, and Mw/Mn less than 6;
 c) 35% paraffin wax; and
 d) 35% EASTOTAC H100, 100° C. partially hydrogenated cyclopentadiene.

III. Ethylene Vinyl Acetate based hot melt adhesives

The ethylene vinyl acetate copolymers (EVA) useful herein are those containing at least about 15 to 45 weight percent by weight vinyl acetate and having a melt index of at least about 6 dg/min, preferably at least about 400 dg/min. The EVA copolymers will preferably comprise less than 40 weight percent vinyl acetate (VA), most preferably 28% VA. The preferred copolymers are available from Exxon under the designation UL 7710 and comprise approximately 28 weight percent vinyl acetate by weight and have a melt index of about 400 dg/min. The amount of the copolymer present in the adhesive varies from about 5 to 45 weight percent by weight, preferably about 10 to 40 weight percent by weight.

Mixtures of ethylene vinyl acetate copolymers may also be used as long as the resultant mixture falls within the described ranges of percent vinyl acetate by weight, and melt index. It is therefore possible to mix two ethylene vinyl acetates having different melt indices and different percentages of vinyl acetate. These copolymers are useful in the range from about 20% to about 50% by weight in the adhesive, preferably from about 25% to about 40%.

In addition to the components described above, the adhesive compositions of the present invention may optionally comprise a second EVA copolymer, specifically one containing about 28 weight percent by weight of vinyl acetate and having a melt index of about 6 to 40 dg/min. The preferred copolymers are available from Exxon under the designation ESCORENE UL 7740 and contain approximately 28 weight percent vinyl acetate by weight and have a melt index of about 40 dg/min. The amount of this copolymer present in the adhesive varies from about 1 to 25 weight percent by weight, preferably 5 to 20% by weight.

The present invention also contemplates the addition to the adhesive of a polymeric additive selected from the group consisting of ethylene methyl acrylate polymers containing 10 to 28 weight percent by weight methyl acrylate, ethylene acrylic acid copolymers having an acid number of 25 to 150, methyl (meth)acrylate copolymers, polyethylene, polypropylene, poly(butene-1-co-ethylene) polymers and low molecular weight and/or low melt index ethylene n-butyl acrylate copolymers. When such additive is present, it is present in amounts up to about 15 weight percent by weight of composition.

The adhesives of the present invention preferably also contain a stabilizer or antioxidant. Among the applicable stabilizers or antioxidants include those discussed above in connection with the ethylene n-butyl acrylate copolymer based adhesives.

The adhesive may optionally comprise an organic phosphoric acid ester selected from the group consisting of tricresyl phosphate, tri-isopropyl phenyl phosphate, tributyl phosphate, triethyl phosphate, trimethyl phosphate, trioctyl phosphate or diphenyl phosphate.

The ethylene vinyl acetate based adhesive also comprise tackifiers and wax. The tackifiers and wax for use herein are the same as those described above for use with ethylene n-butyl acrylate based copolymer based adhesives. Preferably the tackifier is KRYSTALEX® 3085, a low molecular weight thermoplastic hydrocarbon polymer derived largely from alpha-methylstyrene which has a Ring and Ball softening point of 85° C. and is available from Hercules Inc. The preferred wax is paraffin wax with a melting point of 150° C.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

IV. Polyethylene

The polyethylene polymers useful in this embodiment are those having a melt index of about 5000 to 2000 at 190° C. The polymers will have a Ring and Ball softening point of 110° C. or less and a density of about 0.900 to 0.930. A preferred polymer is EPOLENE C10 from Eastman Chemical which has a melt index of 2,250, a Ring and Ball softening point of 104° C., and a density of 0.906. The amount of the polymer present in the adhesive will vary from 30 to 60% by weight, preferably 50% by weight. In addition, small amounts of additional polymers may be included.

The tackifying resins useful in these adhesive compositions are the aliphatic or mixed aliphatic aromatic resins such as the terpenes, and styrenated terpenes. Preferred is ECR 179G from Exxon which has a Ring and Ball softening point of 90° C.

The polyethylene adhesives also include a paraffin or microcrystalline wax with a Ring and Ball softening point of 130 to 200° F. such as, for example, MICROSERE 599 form IGI Bolder which as a Ball and Ring of 195° F. The wax component is utilized at levels of 0 to 30% by weight, preferably 10% by weight, of the adhesive. Other optional waxes may be included in small amounts.

The polyethylene adhesives may also include an antioxidant, such as those described above in Section II above.

The adhesive compositions of the present invention are prepared by blending the components in the melt at a temperature of about 121° C. until a homogeneous blend is obtained, approximately two hours. Various methods of blending are known in the art and any method that produces a homogeneous blend is satisfactory.

The resulting adhesives are characterized by a viscosity less than about 3000 cps at 135° C. They may be applied at temperatures of 200 to 300° F. (93° C. to 149° C.) to provide superior adhesive bonds even when exposed to a wide variety of temperature conditions. The adhesives possess excellent heat stability as characterized by the 260 hour 250° F. (121° C.) thermal stability test, which shows no signs of char, skinning or gel formation. In fact some formulations show thermal stability up to 400 hours at 250° F. (121° C.).

V. Blends

The present invention also contemplates that the adhesives may be a blend of any of the above described polymers or copolymers. For example, the base polymer in the adhesive may be a blend of EnBA and EVA polymers. Other blends include polyethylene and EVA blends, and poly α-olefin and EVA blends. These and any other combination of polymers could be used as the base adhesive, with the additional ingredients chosen according to the polymers selected.

VI. Preferred Embodiments

Any hot melt adhesive which can be applied at the relatively lower temperatures below 300° F. can be used in the present invention wherein a low application temperature adhesive is applied to at least one longitudinal edge of porous and/or non porous plug wrap paper. One most preferred embodiment of an adhesive for the present invention is an adhesive consisting of:

a) 31 parts paraffin wax with a softening point of 150° F.;

b) 21 parts ethylene vinyl acetate copolymer with a melt index of 400 and a vinyl acetate content of 28%;

c) 11 parts or ethylene vinyl acetate copolymer with a melt index of 43 and a vinyl acetate content of 28%;

d) 37 parts of alpha-methyl styrene tackifying resins; and e) 0.5 parts of an antioxidant stabilizer.

Another preferred example of a hot melt adhesive usable in the present invention is an adhesive comprising:

a) 50 parts polyethylene such as EPOLENE C-10 from Eastman Chemicals;

b) 40 parts of an aliphatic-aromatic hydrocarbon tackifying resin;

c) 10 parts of a microcrystalline wax with a softening point of 195° F. such as MICROSERE 5999; and d) 0.2 parts of an antioxidant stabilizer such as LOWINOX (BHT) from Great Lakes Chemicals.

The resultant adhesives are characterized by viscosities of less than about 500.0 cps at 121° C., a Ring and Ball softening point of about 80° C. to about 115° C., fiber tearing bonds on plugwrap paper in the range of about 0° F. to about 120° F. (−18° C. to 51° C.).

The following examples are merely exemplary, and not intended to limit the scope of the present invention in any manner.

EXAMPLES

In the following examples, which are provided for illustrative purposes only, all parts are by weight and all temperatures in degrees Celsius unless otherwise noted.

In the examples, all adhesive formulations were prepared in single blade mixer heated to 135° C. by blending the components until homogeneous.

The adhesives were then subjected to various tests simulating the properties needed for successful commercial applications.

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead was applied at 121° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was ½ inch.

Elevated temperature peel and elevated temperature shear were determined by attaching a 100 gram weight to each specimen and placing the specimens in a forced-draft oven. The temperature was raised in 5.5° C. (10° F.) increments from 38° C. the specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds. In some cases, the sample failed as the temperature was being adjusted within the 100 increments and is noted as such.

Adhesion at various temperatures, as noted, was determined by applying a ¼ inch wide bead of adhesive widthwise to a 2 inch by 3 inch piece of non porous plug wrap paper and immediately bringing a second piece of paper into contact. The bond is aged at each temperature for 24 hours. The bonds were separated by hand and a determination of the amount of fiber tear (FT) was noted.

Bleed through was measured using porous plug wrap paper. This test is done to measure staining of the paper by the adhesive. Six 2×1" sheets of plug wrap paper were stacked. An adhesive bead, ¼" wide was applied between the center two sheets, and aged at 110° F. (43° C.) for 24 hours. The bleed of the adhesive to the top and bottom sheets was noted.

Open time/set time was measured on a automated bond tester using a 0.04" uncompressed bead applied to corrugated single-walled 65 lb. Open time measures that amount of time the product can remain open, i.e., achieve 100% fiber tear, with ten seconds compression time. Set time is the amount of time necessary to compress and achieve 100% fiber tear with 1 second open time.

Triacetin resistance was measured after soaking the adhesive bond for 24 hours in triacetin.

EXAMPLE 1

In this example, conventional plug wrap adhesives were compared to the low application temperature adhesives of the present invention. Comparative Samples A and B are conventional plugwrap adhesives which are applied at 350° F. (177° C.). Samples 1–4 are in accordance with the present invention, and are applied at 250° F. (121° C.). The formulations of the adhesives studied are shown below:

Sample A: is a commercially available EVA based hot melt adhesive from National Starch and Chemical Company under the designation 34-2760.

Sample B: is a commercially available EVA based hot melt adhesive from National Starch and Chemical Company under the designation 34-2757.

| Sample 1: | Amount (% by weight) |
| --- | --- |
| Hindered phenol (antioxidant) | 0.5 |
| Paraffin wax 150° F. | 31 |
| ESCORENE UL 7710 | 21 |
| (EVA, MI 400 dg/min, 28% VA) | |
| ESCORENE UL 7740 | 11 |
| (EVA, MI 40 dg/min, 28% VA) | |
| KRISTALEX 3085 | 37 |
| (α-methyl styrene, 85° C.) | |

| Sample 2: | |
| --- | --- |
| BHT (antioxidant) | 0.5 |
| EPOLENE C10, 104° C. | 50 |
| (polyethylene polymer) | |
| ECR 179G | 40 |
| (hydrocarbon resin) | |
| microcrystalline wax, 195° F. | 10 |

| Sample 3 | |
| --- | --- |
| Hindered phenol (antioxidant) | 0.5 |
| Paraffin wax, 150° C. | 31 |
| EXXON XW 23-AH | 21 |
| (EnBA, 33% BA, MI 300 dg/min) | |
| ELF AUTOCHEM 35BA40 | 11 |
| (EnBA, 33% BA, MI 40 dg/min) | |
| KRISTALEX 3085 | 37 |
| (α-methyl styrene, 85° C.) | |

| Sample 4: | |
|---|---|
| Hindered phenol (antioxidant) | 0.5 |
| Paraffin was, 150° C. | 35 |
| Polyalpha olefin | 30 |
| EASTOTAC H100-R, 100° C. | 35 |

TABLE 1

| | Sample A | Sample B | Sample 1 | Sample 2 | Sample 3 | Sample 4 |
|---|---|---|---|---|---|---|
| Viscosity @ appl temperature | ~4400 cps | ~2735 cps | ~2390 cps | ~3600 cps | ~3025 cps | ~2820 cps |
| Adhesion @ appl temperature | | | | | | |
| RT | 100, 50% | 100, 50% | 100% | 100% | 100% | 100% |
| 40° | 100% | 100% | 100% | 100% | 100% | 100% |
| 100° | 100% | 75, 50% | 100% | 100% | 100% | 100% |
| Bleed through @ 110° F. | Slight | Slight | Very Slight | Very Slight | Slight | Slight |
| Triacetin resistance 24 hrs. | 0% Fiber Tear | 25% Fiber Tear | 0% Fiber Tear | 80% Fiber Tear | 0% Fiber tear | 0% Fiber tear |
| Peel/Shear | Adj 130°/ Adj 190° F. | Adj 130°/ Ad 190° F. | 110°/150° F. | 110°/Adj 190° F. | 100°/Adj 150° F. 150° F. | 100° /Adj 150° F. |
| Stability 260 hrs. | @ 350° F. | @ 350° F. | @ 250° F. | @ 250° F. | @ 250° F. | @ 250° F. |
| Char | V. Slight | None | None | None | None | None |
| ER | None | None | None | None | None | None |
| Other | None | Sl. Hazy | None | None | Sl. Separation | None |
| Delta visc. | -51.0% | -24.0% | 1.4% | 13.3% | -0.9% | 2.1% |
| 04" bead width @ appl Temp Open Time with 10 sec compression | 1.7 secs | 1.0 secs | 2.0 secs | 4.0 secs | 1.5 secs | 2.0 secs |
| Set Time with 1 sec open time | Partial FT = 1.3 secs Full FT = 3.3 secs | Partial FT = 4.0 secs Full FT = N/A | Partial FT = 0.7 secs Full FT = 2.0 secs | Partial FT = 0.7 secs Full FT = 1.1 secs | Partial FT = 1.5 secs Full FT = 6.0 secs | Partial FT = 2.0 secs Full FT = 4.3 secs |

The results in Table 1 above, show that the low application temperature adhesives, Samples 1, 2, 3 and 4, have good adhesion comparable to the conventional adhesives. Samples 1 and 2 are superior in bleed through, and have good thermal stability. The large viscosity change observed with Samples A and B at 260 hours indicates that these adhesives are not stable; the EVA is degrading. Sample 2 shows excellent fiber tear even after 24 hours of exposure to triacetin.

A significant difference between the adhesives of the present invention and conventional adhesives is that the adhesives of the present invention have a long open time and a fast set time allowing for wet out and quick set prior to the cutting step of the cigarette making process.

What is claimed is:

1. A cigarette filter comprising a low application temperature hot melt adhesive.
2. A cigarette filter according to claim 1 wherein the adhesive comprises at least one ethylene copolymer.
3. A cigarette filter according to claim 1 wherein the adhesive comprises ethylene n-butyl acrylate copolymer comprising 10 to 40 weight percent n-butyl acrylate with a melt index of at least 40 dg/min.
4. A cigarette filter according to claim 3 wherein the adhesive further comprises a second ethylene n-butyl acrylate copolymer, wherein the second ethylene n-butyl acrylate copolymer comprises 25 to 35 weight percent n-butyl acrylate.
5. A cigarette filter according to claim 4 wherein the second ethylene n-butyl acrylate copolymer has a melt index of 40 dg/min and comprises 35% ethylene n-butyl acrylate.
6. A cigarette filter according to claim 1 wherein the adhesive comprises:
   a) 10 to 40 weight percent ethylene n-butyl acrylate comprising 10 to 40 weight percent n-butyl acrylate with a melt index of at least 400 dg/min;
   b) 10 to 60 weight percent tackifier;
   c) 0 to 35 weight percent wax; and
   d) optionally 1 to 25 weight percent of a second ethylene n-butyl acrylate, wherein the second ethylene n-butyl acrylate comprises 33 to 35 weight percent butyl acrylate with a melt index of 40 dg/min.
7. A cigarette filter according to claim 6 wherein the adhesive comprises:
   a) 15 to 45% ethylene n-butyl acrylate copolymers having a melt index of at least 200;
   b) 25 to 55% α-methyl styrene tackifying resins; and
   c) 15 to 40% of a low melting point paraffin wax.
8. A cigarette filter according to claim 6 wherein the adhesive further comprises a polymeric additive selected from the group consisting of ethylene methyl acrylate polymers containing 10 to 28 weight percent by weight methyl acrylate, ethylene acrylic acid copolymers having an acid number of 25 to 150, methyl (meth)acrylate copolymers, polyethylene, polypropylene, poly(butene-1-co-ethylene) polymers and low molecular weight and/or low melt index ethylene n-butyl acrylate copolymers, and combinations thereof.
9. A cigarette filter according to claim 1 wherein the adhesive comprises:
   a) from 20 to 40 weight percent of an ethylene/α-olefin. copolymer;
   b) from 20 to 40 weight percent tackifier; and
   c) from 10 to 40 weight percent wax.
10. A cigarette filter according to claim 9 wherein the ethylene/α-olefin copolymer has a composition distribution breath index greater than 50%, and Mw/Mn less than 6.
11. A cigarette filter according to claim 9 wherein the ethylene/α-olefin copolymer has a melt index of 40 to 1000 dg/mn melt point of 71 to 90° C., a density of 0.850 to 0.92, a composition distribution breath index greater than 50%, and Mw/Mn less than 6.

12. A cigarette filter according to claim 9 wherein the adhesive further comprises polymeric additive selected from the group consisting of ethylene methyl acrylate polymers containing 10 to 28 weight percent by weight methyl acrylate, ethylene acrylic acid copolymers having an acid number of 25 to 150, polyethylene, polypropylene, poly(butene-1-co-ethylene) polymers, ethylene n-butyl acrylate copolymers and ethylene vinyl acetate copolymers, and combinations thereof.

13. A cigarette filter according to claim 1 wherein the adhesive comprises ethylene vinyl acetate comprising 5 to 45 weight percent vinyl acetate with a melt index of at least 400 dg/min.

14. A cigarette filter according to claim 13 wherein the adhesive further comprises a second ethylene vinyl acetate copolymer, wherein the second ethylene vinyl acetate copolymer comprises 28 weight percent vinyl acetate with a melt index of 6 to 40 dg/min.

15. A cigarette filter according to claim 13 wherein the adhesive further comprises a polymeric additive selected from the group consisting of ethylene methyl acrylate polymers containing 10 to 28 weight percent by weight methyl acrylate, ethylene acrylic acid copolymers having an acid number of 25 to 150, methyl (meth)acrylate copolymers, polyethylene, polypropylene, poly(butene-1-co-ethylene) polymers and low molecular weight and/or low melt index ethylene n-butyl acrylate copolymers, and combinations thereof.

16. A cigarette filter according to claim 1 wherein the adhesive comprises 30 to 60 weight percent polyethylene polymer with melt index of 5000 to 2000 dg/min at 190° C., a density of 0.900 to 0.930, and a softening point less than 110° C.

17. A cigarette filter according to claim 1 wherein the adhesive comprises blends selected from the group consisting of blends of EnBA and EVA polymers; blends of polyethylene and EVA; blends of poly α-olefin and EVA; and combinations thereof.

18. A cigarette filter according to claim 1 wherein the hot melt adhesive comprises:
  a) 31 parts paraffin wax with a softening point of 150° F.;
  b) 21 parts ethylene vinyl acetate copolymer with a melt index of 400 and a vinyl acetate content of 28%;
  c) 11 parts or ethylene vinyl acetate copolymer with a melt index of 43 and a vinyl acetate content of 28%;
  d) 37 parts of alpha-methyl styrene tackifying resins; and
  e) 0.5 parts of an antioxidant stabilizer.

19. A cigarette filter according to claim 1 wherein the hot melt adhesive comprises:
  a) 50 parts polyethylene;
  b) 40 parts of an aliphatic-aromatic hydrocarbon tackifying resin;
  c) 10 parts of a microcrystalline wax with a softening point of 195° F.; and
  d) 0.2 parts of an antioxidant stabilizer.

20. The process for preparing a cigarette filter comprising applying a low application temperature hot melt adhesive to porous and/or nonporous plugwrap paper.

21. The process according to claim 20 wherein the adhesive comprises at least one ethylene copolymer.

22. The process according to claim 20 wherein the adhesive comprises ethylene n-butyl acrylate copolymer comprising 10 to 40 weight percent n-butyl acrylate with a melt index of at least 40 dg/min, and optionally a second ethylene n-butyl acrylate copolymer, wherein the second ethylene n-butyl acrylate copolymer comprises 25 to 35 weight percent n-butyl acrylate.

23. The process according to claim 20 wherein the adhesive comprises:
  a) 10 to 40 weight percent ethylene n-butyl acrylate comprising 10 to 40 weight percent n-butyl acrylate with a melt index of at least 400 dg/min;
  b) 10 to 60 weight percent tackifier;
  c) 0 to 35 weight percent wax; and
  d) optionally 1 to 25 weight percent of a second ethylene n-butyl acrylate, wherein the second ethylene n-butyl acrylate comprises 33 to 35 weight percent n-butyl acrylate with a melt index of 40 dg/min.

24. The process according to claim 20 wherein the adhesive comprises:
  a) 15 to 45% ethylene n-butyl acrylate copolymers having a melt index of at least 200;
  b) 25 to 55% a-methyl styrene tackifying resins; and
  c) 15 to 40% of a low melting point paraffin wax.

25. The process according to claim 20 wherein the adhesive comprises:
  a) from 20 to 40 weight percent of an ethylene/α-olefin copolymer;
  b) from 20 to 40 weight percent tackifier; and
  c) from 10 to 40 weight percent wax.

26. The process according to claim 25 wherein the ethylene/α-olefin copolymer has a composition distribution breath index greater than 50% and Mw/Mn less than 6.

27. The process according to claim 25 wherein the ethylene/α-olefin copolymer has a melt index of 40 to 1000 dg/min, a melt point of 71 to 90° C., a density of 0.850 to 0.92, a composition distribution breath index greater than 50%, and Mw/Mn less than 6.

28. The process according to claim 20 wherein the adhesive comprises ethylene vinyl acetate comprising 5 to 45 weight percent vinyl acetate with a melt index of at least 400 dg/min.

29. The process according to claim 20 wherein the adhesive comprises 30 to 60 weight percent polyethylene polymer with melt index of 5000 to 2000 dg/min at 190° C., a density of 0.900 to 0.930, and a softening point less than 110° C.

30. The process according to claim 20 wherein the adhesive comprises blends selected from the group consisting of blends of EnBA and EVA polymers; blends of polyethylene and EVA; blends of poly α-olefin and EVA; and combinations thereof.

31. The process according to claim 20 wherein the adhesive comprises:
  a) 31 parts paraffin wax with a softening point of 150° F.;
  b) 21 parts ethylene vinyl acetate copolymer with a melt index of 400 and a vinyl acetate content of 28%;
  c) 11 parts or ethylene vinyl acetate copolymer with a melt index of 43 and a vinyl acetate content of 28%;
  d) 37 parts of alpha-methyl styrene tackifying resins; and
  e) 0.5 parts of an antioxidant stabilizer.

32. The process according to claim 20 wherein the adhesive comprises:
  a) 50 parts polyethylene;
  b) 40 parts of an aliphatic-aromatic hydrocarbon tackifying resin;
  c) 10 parts of a microcrystalline wax with a softening point of 195° F.; and
  d) 0.2 parts of an antioxidant stabilizer.

33. A cigarette comprising the filter of claim 1.

* * * * *